Dec. 8, 1970 V. J. LINNENBOM ET AL 3,545,929
MEASUREMENT OF TRACE AMOUNTS OF CARBON
MONOXIDE IN WATER SOLUTION
Filed Nov. 15, 1968

INVENTORS
VICTOR J. LINNENBOM
JOHN W. SWINNERTON

BY *Walter M. O'Brien*
*R. S. Sciascia* ATTORNEYS

United States Patent Office 3,545,929
Patented Dec. 8, 1970

3,545,929
MEASUREMENT OF TRACE AMOUNTS OF CARBON MONOXIDE IN WATER SOLUTION
Victor J. Linnenbom, Hyattsville, Md., and John W. Swinnerton, Fairfax County, Va., assignors to the United States of America as represented by the Secretary of the Navy
Filed Nov. 15, 1968, Ser. No. 776,054
Int. Cl. B01d 19/00, 53/04; G01n 31/12
U.S. Cl. 23—230  4 Claims

ABSTRACT OF THE DISCLOSURE

A method of measuring trace amounts of carbon monoxide dissolved in water along with light hydrocarbons including methane. The carbon monoxide is stripped from the water sample with a stream of helium, the effluent gas stream dried and passed through a pair of cold traps with joint adsorption of the methane and carbon monoxide in the second cold trap. The methane and carbon monoxide are collected from the second cold trap in a stream of helium and separated in a molecular sieve chromatograph from which the gas stream passes through a reduction zone in which the carbon monoxide is quantitatively reduced to methane and then to a hydrogen flame-ionization detector in which the carbon monoxide is detected as methane.

The invention described herein may be manufactured and used by or for the Government of the United States of America for governmental purposes without the payment of any royalties thereon or therefor.

This invention relates to a method of measuring trace amounts of carbon monoxide dissolved in water which also contains in solution traces of light hydrocarbons including methane. The method has particular, though not exclusive, application to the quantitative analysis of sea water for trace amounts of dissolved carbon monoxide.

In the method described by Swinnerton, Linnenbom and Cheek, Anal. Chem. 34, 1509 (1962), dissolved gases, including carbon monoxide, are stripped from the water sample with a stream of helium, the effluent gas stream dried and sent directly through the gas chromatograph for resolution and the separated carbon monoxide detected by means of a thermal conductivity cell. The minimum limit of detection for carbon monoxide by this method is about $5 \times 10^{-2}$ ml./liter.

Sea water is known to contain traces of dissolved light hydrocarbons, usually $C_1$ to $C_4$ hydrocarbons which are predominantly methane. Sea water is also known to contain dissolved carbon monoxide in concentrations which are far below that defined by the minimum limit of detection of the above prior art method. Accordingly, it is desirable to have a method of greater sensitivity for measuring trace amounts of carbon monoxide dissolved in sea water.

It is an object of the present invention to provide a method of high sensitivity for measuring trace amounts of carbon monoxide dissolved in water along with trace amounts of light hydrocarbons including methane.

The above and other objects are accomplished in the practice of the method of the present invention which comprises, broadly stated, stripping the dissolved hydrocarbons and carbon monoxide from the water sample by purging with a stream of helium, drying the effluent gas stream, passing the dried gas stream through a first cold trap in which hydrocarbons above methane and any carbon dioxide are selectively adsorbed and through a second cold trap in which methane and carbon monoxide are selectively adsorbed, collecting the methane and carbon monoxide in a stream of helium and effecting resolution of the methane and carbon monoxide in a gas chromatograph, reducing the carbon monoxide in the effluent gas to methane and detecting it as such in a hydrogen flame-ionization detector. The method provides a minimum limit of detection for carbon monoxide of $10^{-8}$ ml./liter. The methane stripped from the water sample precedes in the gas stream that from the reduction of the carbon monoxide and may be separately detected.

Figure 1:
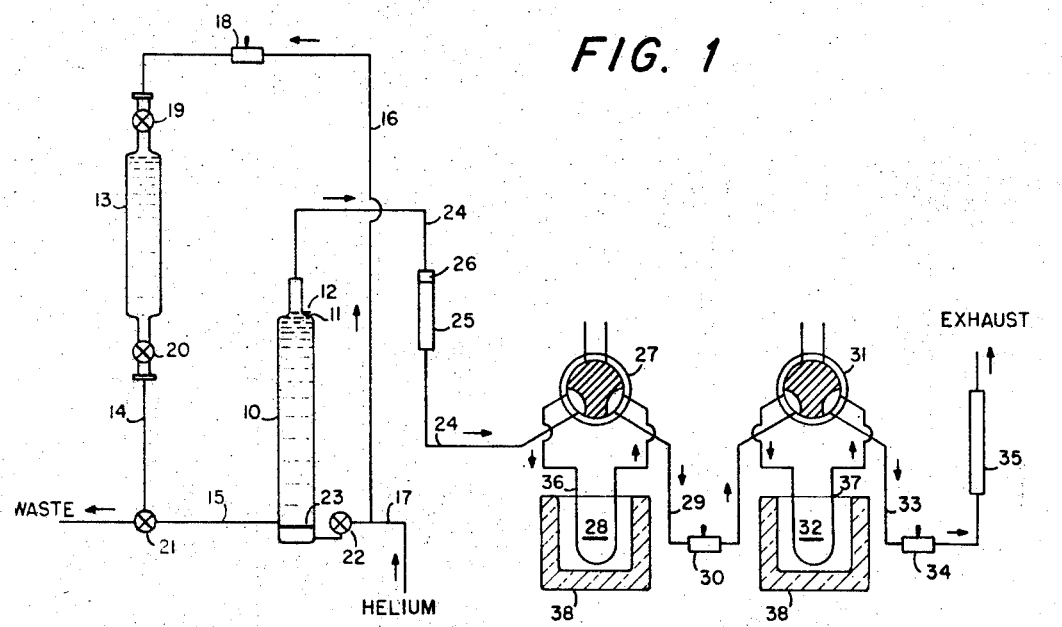
Figure 2:
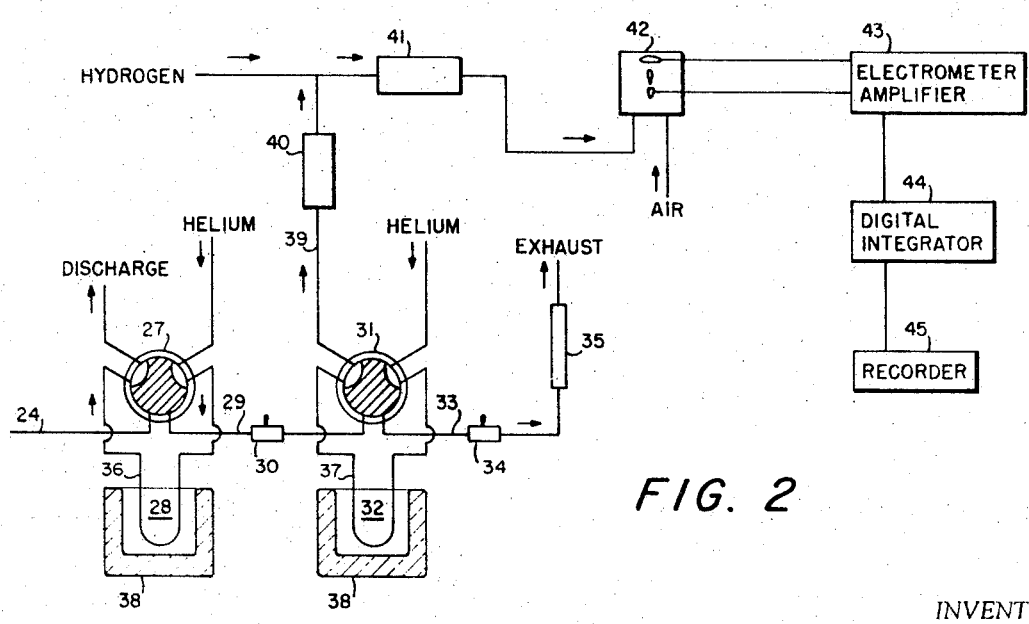

The method of the invention will be more fully understood by reference to the following description when read in conjunction with the accompanying drawing in which like numerals indicate like parts and:

FIG. 1 is a schematic showing of that part of an apparatus suitable for carrying out the method of the invention in which purging of the water sample and selective adsorption of hydrocarbons and carbon monoxide are effected, FIG. 2 is a schematic showing of the remaining part of the apparatus for carrying out the method.

The apparatus has as principal parts, a chamber for stripping of the water sample, a pair of cold traps, a gas chromatograph, a catalytic reduction chamber and a hydrogen flame-ionization detector with associated recording elements.

Referring to FIG. 1, the chamber 10 for stripping of the water sample is a tubular glass vessel of narrow cross-section which may be about 77 mm. I.D. The length of this chamber may vary and will depend on the volume of the water sample used, for example, for volumes of 8 to 10 ml., the chamber length may be 15 cm. and for volumes of 30 ml. or so the chamber length may be 50 cm. For introduction of small volume water samples into the chamber, a short tubular extension 11 is provided at the top of the chamber which is closed with a rubber self-sealing cap 12. The sample is injected into the chamber by means of a syringe fitted with a sharp needle which passes through the self-sealing cap. The stripping chamber is filled with helium prior to introducing the water sample. Large volume water samples, over 100 ml., are introduced into the stripping chamber under a helium atmosphere by a transfer system in which the sample water is delivered from a storage bottle 13 through lines 14 and 15 to enter the stripping chamber near the bottom and helium is imposed on the water sample through line 16 connected at one end to the top of the storage bottle and at the other to the helium input line 17. Helium flow to the storage bottle is controlled by toggle valve 18 and the valve 19 in the upper stem of the storage bottle. Sample water flow to the stripping chamber is controlled by valve 20, valve 21 in the lower stem of the storage bottle, and two-way valve 22 in the line 15. Helium for stripping of the water sample is introduced through line 17, into the bottom of the chamber 10 where it passes through a circular plate 23 of coarse glass frit which is mounted across the chamber and divides the helium stream into small gas bubbles before it enters the water sample. A magnetic stirrer (not shown) is arranged in conventional manner to agitate the water sample in the chamber during the purging with helium. Helium, prior to entering the system, is passed through a molecular sieve column immersed in an acetone-solid carbon dioxide bath at —80° C. to remove any traces of hydrocarbons in the helium. Pressure from the storage cylinder is used to cause flow of helium through the system.

After the water sample has been lodged in the stripping chamber and purging of the water sample with helium started, the helium carrier gas stream from the top of the stripping chamber passes through line 24 and drying tube 25 to and through the first 6-way rotary valve 27 and a solid adsorbent in the associated cold trap 28 and then by way of line 29 and toggle valve 30 to and through the second rotary valve 31 and a solid adsorbent in the associated cold trap 32. The residual gas stream leaves the system by way of line 33, toggle valve 34 and flow meter 35. The latter may be a conventional glass ball-type flow meter. The drying tube is detachably connected in the line 24 by a quick connector (Swagelok) 26 and contains a granular solid dessicant which may be anhydrous calcium sulfate.

The rotary valves 27 and 31 are commercial gas sampling valves (Perkin-Elmer 154/0067—U.S.P. 2,757,541) which have six ports in the shell and a rotary plug with two separate, non-intercommunicating channels which, by rotation of the plug, are brought into registry each with a separate set of two adjacent ports and the third set of ports thereby closed. Each of these rotary valves has been modified by replacing the gas-sample loop with 8" long-3/16" O.D. aluminum U-tubes 36 and 37, respectively. These U-tubes contain the solid adsorbent for the traps. For selective adsorption of gases from the carrier gas stream the U-tubes 36 and 37 are connected by gas flow lines with one port each of two sets of ports of the respective rotary valves as indicated in the drawing. The companion port of each of the two sets of ports of rotary valve 27 is connected, on the one hand, with the line 24 from the stripping chamber and, on the other, with the line 29 between the rotary valves. The companion port of the two sets of ports of rotary valve 31 is connected, on the one hand, with the line 29 and, on the other, with the discharge line 33.

In the cold traps, the column of solid adsorbent in the U-tubes 36 and 37 is held at a temperature of about −70 to −80° C. by immersion of the U-tubes in a fluid refrigerant, suitably an acetone-solid carbon dioxide bath contained in a Dewar type flask 38. The solid adsorbent in the first cold trap 28 is one which selectively traps out all hydrocarbons above methane and any carbon dioxide from the carrier gas stream and suitably is activated alumina of 30-60 mesh. The solid adsorbent in the second cold trap 32 is one which selectively traps out both methane and carbon monoxide from the carrier gas stream and suitably is a 30-60 mesh mixxture of a 13X (about 10 angstroms pore diameter) molecular sieve material having a strong retentivity for carbon monoxide, for example, sodium zeolite, and activated charcoal in a ratio of about 3:1 by weight.

In the practice of the first portion of the method which is carried out in the apparatus of FIG. 1, flow of helium through the glass frit plate and the stripping chamber is maintained for a time sufficient to strip the dissolved gases from the water sample. For example, at helium flow rates of from about 50 to 65 ml./min., the time required to strip the dissolved gases from one liter of water at room temperature will range from about 9–10 minutes. In practice, the flow of helium is extended to about 14 minutes. The drying and successive adsorption steps are accomplished by flowing the helium carrier gas stream from the stripping column through the drying tube 25 and then, serially, through the adsorbent column in the second cold trap 32, after which the residual gas stream and accompanying air leaves the system by way of discharge line 33.

In the first cold trap 28, all hydrocarbons above methane and any carbon dioxide are absorbed from the carrier gas stream, ensuring their noninterference with the carbon monoxide analysis. In the second cold trap 32, both methane and carbon monoxide are adsorbed. The charcoal-sodium zeolite adsorbent will retain both methane and carbon monoxide at a temperature of −77° C. for at least 20 minutes before methane begins to bleed through the cold trap. Purging is terminated before this event, generally at 14 minutes. Air in the carier gas stream will completely pass through the cold traps to be discharged into the atmosphere except for a small residual amount of oxygen. Oxygen will not interfere since it is trapped on the charcoal-sodium zeolite column and subsequently separated from the methane and carbon monoxide in the gas chromatograph.

Calibration of the system for the analysis is carried out by using measured small volumes of a standard water solution of carbon monoxide which are injected into the stripping chamber which is almost completely filled with a known volume of water, previously purged with a stream of helium, for example, in ratios of 2–3 ml. of the standard solution to 1 liter of the water, and then proceeding by exactly the same procedure used for analysis of samples of the unknowns. The standard carbon monoxide solution was prepared by equilibrating distilled water at 25° C. with carbon monoxide at known partial pressure (total pressure minus aqueous tension), diluting to the desired concentration by injecting a measured volume of the equilibrated solution into the bottom of a calibrated erlenmeyer flask previously filled completely with carbon monoxide-free water and inserting a tapered ground-glass stopper in a manner such that no gas space remained. The solution was mixed by a magnetic stirring bar contained in the flask. The final concentration of carbon monoxide was calculated from the partial pressure, the adsorption coefficient and the dilution factor.

After completion of the stripping and selective adsorption operations for the analysis, the traps are closed to inflow and outflow and the subsequent steps in the method conducted by use of the apparatus shown schematically in FIG. 2.

The traps are isolated from each other and from the stripping section of the system by closing the toggle valves 30 and 34 at the exit, respectively, of rotary valves 27 and 31 and releasing the quick connector (Swagelok) 26 to close the line 24 to the rotary valve 27. The rotary valves are adjusted for reverse flow of gas through the associated traps as indicated in the drawing. The traps are then stripped of the adsorbed gases in separate operations. This is done by immersing the U-tube in a hot water bath at 90° C. for one minute to desorb the trapped gases and then back-flushing the adsorbent column with a stream of helium. The desorbed gases, methane and carbon monoxide, collected in the helium stream from the second tray 32 are processed for quantitative determination of the carbon monoxide. The desorbed gases collected in the helium stream from the first trap 28 are discharged from the system or, if desired, subjected to analysis for quantitative determination of the constituent hydrocarbons.

The methane and carbon monoxide collected from the second trap are delivered by the helium carrier gas through line 39 into a molecular sieve chromatographic column 40 in which the methane and carbon monoxide are separated in the gas stream. Small amounts of residual oxygen are also separated in the chromatographic column from each of the other two gases. The order of appearance of these gases in the carrier gas stream emerging from the chromatographic column is oxygen. methane and carbon monoxide.

The carrier gas stream is passed to a reduction zone 41 and the carbon monoxide quantitatively reduced therein to methane. This may be done by flowing hydrogen into the carrier gas stream and passing the combined streams through a 3 inch length of 1/4 inch O.D. steel tubing packed with a nickel catalyst (Porter and Volman, Anal. Chem. 34, 748 (1962)) which is reduced nickel supported on 30–60 mesh firebrick (Silocel) and arranged in an Alundum tube which is heated to 300° C. by means of an exteriorly disposed electrical heating coil. The flow rate of the carrier gas stream through the reducing zone is that which prevails in the second section of the apparatus which suitably is 65 ml./min. Hydrogen is flowed into the carrier gas stream at a rate of 40 ml./min. In this operation, small residual amounts of oxygen in the carrier gas stream are of no effect and the methane stripped from the water sample simply passes through the reduction zone.

The reduction of the carbon monoxide to methane in the carrier gas stream makes it possible to apply the high sensitivity of the hydrogen flame-ionization detector for methane ($10^{-8}$ ml./liter) to the measurement of trace amounts of carbon monoxide present in water.

The carrier gas stream emerging from the reduction operation and containing the methane from the reduction of the carbon monoxide and also hydrogen is passed into a conventional hydrogen flame-ionization detector 42. The flame in the detector is provided by combustion of an air-hydrogen mixture. The methane in the carrier gas is flamed and burned in air separately supplied to the detector and the resulting ions are collected by a ring electrode above the flame. The ion current is proportional to the amount of carbon atoms present in the flame and is measured by the electrometer amplifier 43. The amplified ion current is fed to a digital integrator 44 (F & M-Hewlett-Packard Sieves 700) and the results recorded on a chart recorder 45. By virtue of the calibration of the system, results recorded on the chart may be read in terms of quantitative amounts of carbon monoxide in the water.

In addition to measurement of the methane derived by reduction of the carbon monoxide, the method may also be used for quantitative determination of the methane stripped from the water. The method has application for the development of depth profiles of dissolved carbon monoxide in sea water. It may also be used for measurement of dissolved carbon monoxide and methane in stream pollution work.

Since the invention described herein may be variously practiced without departing from the spirit or scope thereof, it is intended that the foregoing description shall be taken primarily by way of illustration and not in limitation except as may be required by the appended claims.

What is claimed and desired to be secured by Letters Patent of the United States is:

1. A method of measuring trace amounts of carbon monoxide dissolved in water along with trace amounts of light hydrocarbons including methane which comprises purging a known quantity of the water with a stream of helium for a time sufficient to strip and collect the carbon monoxide and light hydrocarbons therefrom, drying the effluent gas stream, passing the dried gas stream through a first adsorbent column maintained at a temperature at which all hydrocarbons above methane and any carbon dioxide are selectively adsorbed from the gas stream, passing the residual gas stream through a second adsorbent column maintained at a temperature at which both methane and carbon monoxide are selectively adsorbed from the gas stream, closing the adsorbent columns to inflow and outflow, heating the second adsorbent column to a temperature at which the carbon monoxide and methane are desorbed and collecting the desorbed methane and carbon monoxide in a stream of helium, passing this gas stream through a chromatograph in which the methane is separated from the carbon monoxide within the gas stream, subjecting the effluent gas stream to quantitative reduction therein of the carbon monoxide to methane, and passing the resulting gas stream through a hydrogen flame-ionization detector and detecting therein the methane derived from reduction of the carbon monoxide.

2. A method as defined in claim 1, wherein the temperature range for the first and second adsorption columns is from about $-70$ to $-80°$ C.

3. A method as defined in claim 1, wherein the methane stripped from the water and the methane derived from reduction of the carbon monoxide are sequentially detected in the hydrogen flame-ionization detector.

4. A method as defined in claim 2, wherein the second adsorbent column is a mixture of sodium zeolite of about 10 angstroms pore diameter and activated charcoal in a weight ratio of about 3:1.

References Cited
UNITED STATES PATENTS 3,352,644  11/1967  Lysyj _____ 23—232

OTHER REFERENCES

Swinnerton et al., Anal. Chem. 34, #4, April 1962, pp. 483–485.

MORRIS O. WOLK, Primary Examiner

R. M. REESE, Assistant Examiner

U.S. Cl. X.R.

23—232, 253; 55—47, 68, 84, 208